Patented Aug. 9, 1949

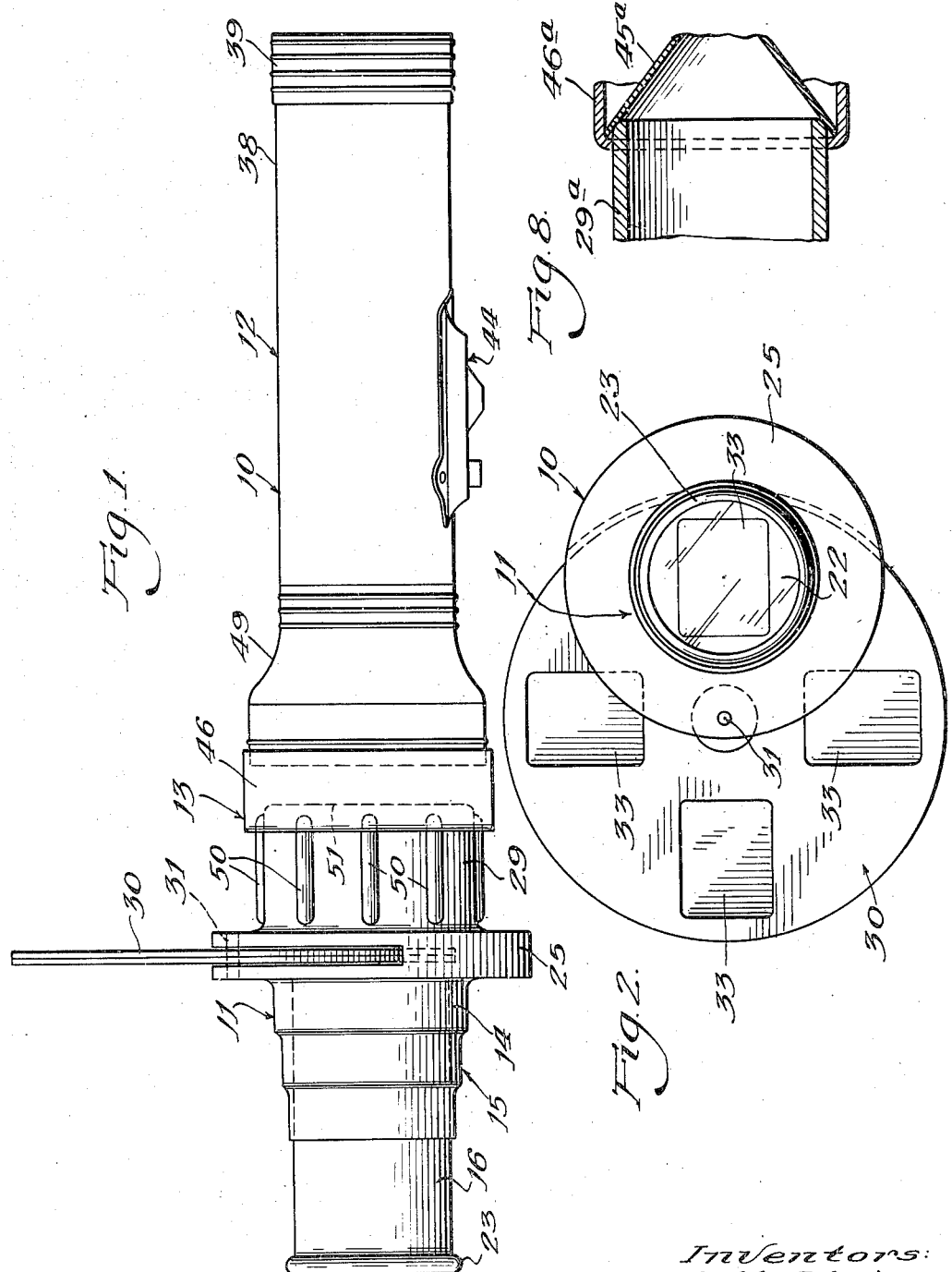

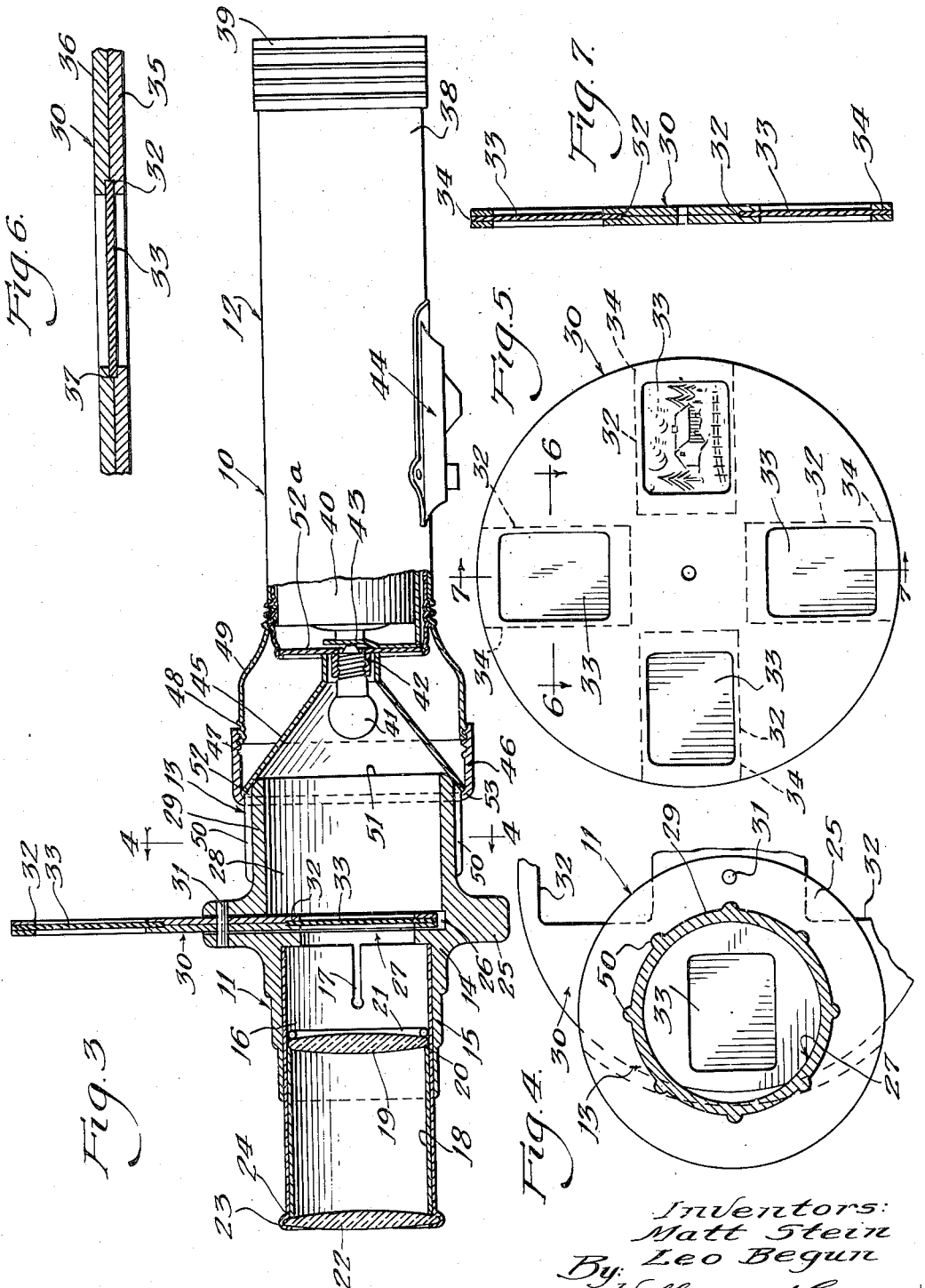

2,478,336

UNITED STATES PATENT OFFICE 2,478,336

FLASHLIGHT FILM AND PICTURE PROJECTING DEVICE

Matt Stein and Leo Begun, Chicago, Ill., assignors to Hollywood Comic Flash, Inc., Chicago, Ill., a corporation of Illinois Application October 27, 1945, Serial No. 624,996

4 Claims. (Cl. 88—24)

This invention relates to a flashlight picture projector. More particularly, this invention relates to a portable picture projector apparatus which employs and embodies a standard type of dry cell battery flashlight as the source of light therein and which may be used as a toy by children and others for entertainment as well as for educational purposes and for use by dentists in projecting and studying dental X-ray pictures, as well as for other purposes.

The primary object of the invention is to provide a novel flashlight picture projector apparatus which is simple and economical in construction and which is especially adapted for use in the various ways set forth in the preceding paragraph.

Another object of the invention is to provide a picture projector unit embodying a novel mounting which is so constructed that a commercial flashlight of conventional design may be readily detachably mounted upon and operatively connected to the picture projector unit, without the need for or exercise of any special skill, so as to function as the source of light therefor.

An additional object of the invention, auxiliary to the object stated immediately above, is to provide a novel detachable friction fit connection between the picture projector unit and the flashlight so that a conventional commercial type of flashlight may be readily attached to the picture projector by a child and without the need for or exercise of any special skill.

A further object of the invention is to provide in and for the new picture projector apparatus a novel rotatably mounted picture supporting member embodying picture holding pockets in which pictures may be readily mounted for projection.

Still another object of the invention is to construct the picture-supporting member which is embodied in the flashlight picture projector in such a manner that a child or other person may readily and without the exercise of or need for any special skill insert various pictures into and remove the same from the picture-holding pockets which are embodied in the new rotatably mounted picture-supporting member of the present invention.

Other and further objects of the present invention will be apparent from the following description and claims and are illustrated in the accompanying drawings which, by way of illustration, show preferred embodiments of the invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings,

Fig. 1 is a top plan view illustrating a preferred embodiment of the present invention;

Fig. 2 is a front end elevational view thereof as seen from the left hand end in Fig. 1;

Fig. 3 is a central vertical sectional view through the picture-holding and projecting unit and through the novel means for effecting a detachable friction fit connection between the picture-holding and projection unit, a part of the wall of the flashlight casing being broken away to reveal the arrangement of the parts embodied therein;

Fig. 4 is a transverse sectional view on line 4—4 in Fig. 3 showing a part of the novel means embodied in the present invention for providing a detachable friction fit or interconnection between the flashlight source of light and the picture-holding and projector unit embodied in the present invention;

Fig. 5 is an elevational view of the rotatable picture-holding disc which is embodied in the present invention;

Fig. 6 is a central sectional view on line 6—6 in Fig. 5 showing the arrangement of a picture or films in one of the picture-holding pockets in the rotatable picture-holding disc, and showing one manner in which the picture or film-holding pockets may be constructed;

Fig. 7 is a central sectional view on line 7—7 through the rotatable picture-holding disc; and Fig. 8 is a fragmentary sectional detail view illustrating a slightly modified form of the invention.

A typical embodiment of the new flashlight picture projector is illustrated in Figs. 1 to 7, inclusive, of the drawings, wherein it is therein generally indicated at 10, and comprises a picture-holding and projecting unit, which is generally indicated at 11, and a source of light in the form of a flashlight 12, the picture-holding and projecting unit 11 and the flashlight source of light 12 being detachably interconnected by a friction fit interconnection which is generally indicated at 13 and which will be described more fully hereinafter.

The picture-holding and projecting unit 11 includes a generally tubular body 14 which may be made of any suitable material, and in any suitable manner, as, for example, of an aluminum alloy or like light metal, paperboard, plastics, or the like. The body 14 of the picture-holding and projecting unit 11 has a forwardly extending portion 15 in which a portion of a lens tube barrel or holder 16 is slidably and adjustably mounted by a pin and slot connection 17. A lens tube 18 is arranged in the lens tube barrel or holder 16 and a condenser lens 19 is arranged in the lens tube barrel or holder 16, the lens 19 being urged against the inner end wall 200 of the lens tube 18 by a spring 21. A focusing lens 22 is mounted in an annular channel or bead 23 which is formed on the outer end portion of the lens tube barrel or holder 16 and the focusing lens 22 lies against the outer end wall 24 of the lens tube 18.

The body 14 of the picture-holding and projecting unit 11 has an enlarged annular flange 25 formed thereon externally thereof and an annular channel or groove 26 is formed in the body 14 and surrounds the film gate or film aperture 27 which extends between the interior of the lens tube barrel or holder 16 and the interior 28 of the rear portion 29 of the body 14 of the picture-holding and projecting unit 11.

An annular picture or film-holding member or disc 30 is eccentrically and rotatably mounted, as at 31, on the enlarged annular flange 25 of the body 14 of the picture-holding and projecting unit 11. The annular picture or film-holding member 30 has a plurality of picture or film-holding pockets 32 formed therein and a picture or film 33 is adapted to be slidably inserted into each of the picture or film-holding pockets 32 through the inlet 34 of each pocket 32 which opens onto the periphery of the annular picture or film-holding member 30, as shown in Figs. 5 and 7.

The annular picture-holding member or disc 30 may be made of any suitable material such, for example, as a light aluminum alloy or other suitable metal, or of paperboard, or plastic materials, and is shown as being made of two pieces of material 35 and 36 adhesively secured together with the film-holding pockets 32 formed by cooperating complementary recesses 37 formed therein. (Fig. 6.)

The flashlight unit 12 is of a conventional commercial type available on the market and includes a casing or shell 38 having a removable threaded closure cap 39 normally closing one end of the casing 38 and through which end the dry cells 40 may be inserted into the casing 38. A light bulb 41 is mounted in a supporting socket 42 and the base of the bulb 41 engages a spring contact 43, these parts 42 and 43 being mounted upon the transverse front wall 52a of the flashlight casing 38 (Fig. 3). Current to the light bulb 41 is controlled by a manually operable button switch unit 44 which is mounted on the wall of the casing 38 in a manner which is well understood in the art.

The flashlight unit 12 includes a conical-shaped reflector 45 which surrounds and projects forwardly of the light bulb 41, the base of this reflector 45 being attached to the front wall 52 of the flashlight casing 38. A glass disc or lens (not shown) is normally mounted in the outer or front end portion of the reflector 45 of the flashlight unit 12 and is normally retained therein by means of a len-retaining cap or ring 46 which is commonly formed of slightly resilient plastic material. This lens-retaining cap 46 is internally threaded at its rear end, as at 47, so that it may be detachably attached to the externally threaded portion 48 of the flared front end portion 49 of the flashlight casing 38. The cap 46 has an inturned annular flange 53 at its other end (Fig. 3.)

However, in the use of the flashlight unit 12 as the source of light in the new picture or film-holding projector the glass disc or lens is removed from the front end of the reflector 45 and the inturned annular flange 53 of the resilient plastic lens-retaining cap 46 is slidably and frictionally fitted over and upon a series of parallel retaining or friction-gripping ribs 50 which are formed integrally with and as raised formations upon the outer surface of the tubular wall 29 of the body 14 of the picture or film-holding unit 11. As shown in Figs. 1 and 3 the ribs 50 extend from a point just inwardly of the end wall 51 of the tubular wall 29 to a point adjacent the enlarged annular flange 25 and are preferably tapered at their outer ends, as at 52, to facilitate insertion of the cap 46 thereover and so that the outer end portion of the conical reflector 45 will lie flush up against the outer ends of the ribs 50 and over the end edge 51 of the tubular wall 29, as shown in Fig. 3.

In the use and operation of the new picture or film-holding and projecting device, a plurality of films or pictures may be inserted in the film pockets 33 of the annular film or picture-holding member 30, this being accomplished by slipping the films or pictures 33 through the inlets 34 of the picture or film-holding member 30 into the film-holding pockets 32.

The flashlight unit 12 may then be readily attached to the film or picture-holding and projecting unit 11, so as to serve as the source of light therefor. This is readily accomplished by slipping the inturned annular flange 53 of the cap 46 of the flash-light unit 12 over and into frictional gripping relationship with the frictional gripping ribs 50 which are formed on the tubular wall 29 of the body 14 of the picture or film-holding and projecting unit 11.

The lens tube barrel 16 may then be adjusted, within the tubular wall 15 of the picture or film-holding projecting unit 11, and along the pin and slot connection 17, so as to secure the proper focus of the fixed focal length lenses 19 and 22 relative to the picture or film 33 which is disposed at the film gate or aperture 27.

The annular picture or film-holding member 30 may then be rotated upon its pivot 31 so as to bring the pictures or films 33 selectively into registration with the film gate or aperture 27, whereupon the manually operable button switch 44 on the wall of the flashlight casing 38 may be manipulated so as to close circuit through the dry cell battery 40 and the light bulb 41. The light bulb 41 will thus be illuminated and the light therefrom will be directed by the reflector 45 to and through the tubular portion 29 of the body 14 of the lens-holding and projecting unit 11 so as to illuminate the picture or film 33 which is disposed in registry with the film gate or aperture 27. The thus illuminated image of the film or picture 33 disposed in the film aperture or film gate 27 will thence be directed by the lenses 19 and 22 onto any selected surface which may be, for example, the wall of a room, or onto a suitable screen, or other surface.

The various pictures or films 33 carried by the film or picture-holding member 30 may be selectively moved or brought into registry with the film gate or aperture 27 by merely manipulating the rotatably film or picture-holding member 30 upon its pivot 31.

It will be noted that the new picture or film projector device may be readily held in the hands of and operated by a child, this being accomplished by grasping the flashlight casing 38 in one hand with the thumb of the hand in position to operate the flashlight switch 44, the other hand being free to rotate the annular picture or film-holding member 30.

After the new picture-projecting device has been used, it may readily be disassembled by merely slipping the cap 46 off from the friction-gripping ribs 50 and such readily assembly and disassembly of the flashlight unit 12 and the picture-holding and projecting unit 11 facilitates the use of the new picture or film-projecting device and also the packing of the same for shipment and its storage when not in use.

A slightly modified form of the invention is shown in Fig. 8 wherein parts corresponding to similar parts in the form of the invention shown in Figs. 1 to 7, inclusive, have been given similar reference numerals followed by the additional and distinguishing reference character "a". This form of the invention is substantially similar to that shown in Figs. 1 to 7, inclusive, except that in this form of the invention the raised ribs 50 on the wall 29 (Figs. 1 to 7, inclusive) are omitted and the cap 46a is frictionally fitted directly onto the wall 29a, as shown in Fig. 8.

It will thus be seen from the foregoing description, considered in conjunction with the accompanying drawings, that the new flashlight projector device provides a simple and inexpensive projector which may be used not only as a toy for the amusement and entertainment of children, but also as an educational device for projecting still pictures and for use by dentists and others in projecting dental X-ray films which may readily be mounted in the annular film-holding member 30 and projected onto a suitable screen or other surface for examination and study.

It will thus also be seen from the foregoing description, considered in conjunction with the accompanying drawings, that the present invention provides a novel and simple picture or film-holding and projecting device embodying a conventional commercial type of flashlight as the light source therefor, and thus accomplishes its intended objects and has the desirable advantages and characteristics, including those hereinbefore pointed out, and others which are inherent in the invention.

We claim:

1. A still picture or film-holding and projecting device comprising a picture or film-holding and projecting unit including a body having a film gate or aperture formed therein and having an optical system, means for slidably and detachably mounting said optical system in said body at one side of the said film gate or aperture, a picture or film-holding member eccentrically and rotatably mounted upon the said body and having a plurality of picture or film-holding pockets therein each adapted to have a picture or film mounted therein and said pictures or films being adapted to be manually and selectively brought into registration with the said film gate or aperture by rotation of the said picture or film-holding member, said body including a tubular wall portion at the side of the said film gate or aperture opposite the side at which the said optical system is arranged, said picture or film-holding device including a dry cell battery flashlight as the source of light therefor and for illuminating the said picture or film which is disposed in registry with the said film gate or aperture, and means for detachably and frictionally and slidably mounting the said flashlight upon the said tubular wall portion of the said body.

2. A still picture or film-holding and projecting device as defined in claim 1 in which each of the said film or picture pockets has an inlet opening into the peripheral surface of the said rotatable picture or film-holding member for the insertion of pictures or films into and their removal from the said picture or film-holding pockets.

3. A still picture or film-holding and projecting device comprising a picture or film-holding and projecting unit including a body having a film gate or aperture formed therein and having an optical system mounted therein at one side of the said film gate or aperture, a picture or film-holding member eccentrically and rotatably mounted upon the said body and having a plurality of picture or film-holding pockets therein each adapted to have a picture or film mounted therein and said pictures or films being adapted to be manually and selectively brought into registration with the said film gate or aperture by rotation of the said picture or film-holding member, said body including a tubular wall portion at the side of the said film gate or aperture opposite the side at which the said optical system is arranged, said picture or film-holding device including a dry cell battery flashlight as the source of light therefor and for illuminating the said picture or film which is disposed in registry with the said film gate or aperture, and means for detachably and frictionally mounting the said flashlight upon the said tubular wall portion of the said body, the said means providing a detachable and frictional fit interconnection between the said picture-holding and projecting unit and the said flashlight unit including an annular row of raised ribs formed in the external surface of the said tubular portion of the said body and an annular member embodied in the said flashlight unit at one end of the flashlight casing and adapted to be slid onto and off the said ribs and into and out of frictional engagement therewith so as to detachably hold the said picture-holding and projecting unit and the said flashlight unit in assembled relationship.

4. A still picture-holding and projecting device as defined in claim 3 in which the said means providing a detachable and frictional fit interconnection between the said picture-holding and projecting unit and the said flashlight unit includes an annular row of raised ribs formed in the external surface of the said tubular portion of the said body and an annular member embodied in the said flashlight unit at one end of the flashlight casing and adapted to be slid onto and off the said ribs and into and out of frictional engagement therewith so as to detachably hold the said picture-holding and projecting unit and the said flashlight unit in assembled relationship, and in which the said flashlight unit includes a substantially conical reflector having a light bulb arranged in the smaller end portion thereof and in which the larger end portion of the said reflector projects over one end wall of the said tubular portion of the said body and into engagement with the inner surface of the wall of the said annular member which is embodied in the said flashlight unit.

MATT STEIN.
LEO BEGUN.

REFERENCES CITED

The following references are of record in the file of this patent:

UNITED STATES PATENTS

| Number | Name | Date |
|---|---|---|
| 778,891 | Rausch | Jan. 3, 1905 |
| 1,071,708 | Cone | Sept. 2, 1913 |
| 1,241,771 | Schram | Oct. 2, 1917 |
| 1,729,660 | Farmer | Oct. 1, 1929 |
| 2,090,086 | Weiner | Aug. 17, 1937 |
| 2,135,952 | Stephens | Nov. 8, 1938 |

FOREIGN PATENTS

| Number | Country | Date |
|---|---|---|
| 191,468 | Great Britain | Jan. 12, 1923 |